(12) United States Patent
Courtiol et al.

(10) Patent No.: US 12,175,670 B2
(45) Date of Patent: *Dec. 24, 2024

(54) SYSTEMS AND METHODS FOR IMAGE CLASSIFICATION

(71) Applicants: OWKIN, INC., New York, NY (US); OWKIN FRANCE SAS, Paris (FR)

(72) Inventors: Pierre Courtiol, Paris (FR); Eric W. Tramel, Le Kremlin Bicetre (FR); Marc Sanselme, Paris (FR); Gilles Wainrib, Pantin (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,205

(22) Filed: Oct. 24, 2022

(65) Prior Publication Data

US 2023/0186467 A1 Jun. 15, 2023

Related U.S. Application Data

(63) Continuation of application No. 17/183,321, filed on Feb. 23, 2021, now Pat. No. 11,482,022, which is a continuation of application No. 16/778,179, filed on Jan. 31, 2020.

(60) Provisional application No. 62/799,936, filed on Feb. 1, 2019.

(51) Int. Cl.
*G06K 9/00* (2022.01)
*G06F 18/21* (2023.01)
*G06T 7/00* (2017.01)
*G06V 10/764* (2022.01)
(Continued)

(52) U.S. Cl.
CPC ........ *G06T 7/0012* (2013.01); *G06F 18/2163* (2023.01); *G06V 10/764* (2022.01); *G06V 10/82* (2022.01); *G06V 20/695* (2022.01); *G06V 20/698* (2022.01); *G06T 2207/20084* (2013.01); *G06T 2207/30024* (2013.01)

(58) Field of Classification Search
None
See application file for complete search history.

(56) References Cited

U.S. PATENT DOCUMENTS

2020/0372635 A1* 11/2020 Veidman .................. G06N 3/08

OTHER PUBLICATIONS

Wang et al., "Deep learning for identifying metastatic breast cancer", Jun. 18, 2016 (Year: 2016).
(Continued)

*Primary Examiner* — SJ Park
(74) *Attorney, Agent, or Firm* — MARSHALL, GERSTEIN & BORUN LLP

(57) ABSTRACT

A method and apparatus of a device that classifies an image is described. In an exemplary embodiment, the method includes tiling at least one region of interest of the input image into a set of tiles. For each tile, the method includes extracting a feature vector of the tile by applying a convolutional neural network, wherein a feature is a local descriptor of the tile; and computing a score of the tile from the extracted feature vector, said tile score being representative of a contribution of the tile into a classification of the input image. The method also includes sorting a set of the tile scores and selecting a subset of the tile scores based on their value and/or their rank in the sorted set. The method also includes applying a classifier to the selected tile scores in order to classify the input image.

11 Claims, 8 Drawing Sheets

(6 of 8 Drawing Sheet(s) Filed in Color)

(51) Int. Cl.
    *G06V 10/82*     (2022.01)
    *G06V 20/69*     (2022.01)

(56)     References Cited

OTHER PUBLICATIONS

Nikitenko et al., "Applicability of white-balancing algorithms to restoring faded colour slides: an empirical evaluation", Dec. 2008 (Year: 2008).
Cruz-Roa et al., "Automatic detection of invasive ductal carcinoma in whole slide images with convolutional neural networks", Medical Imaging 2014 (Year: 2014).
Rakhlin et al., "Deep convolutional neural networks for breast cancer histology image analysis", ICIAR 2018 (Year: 2018).

\* cited by examiner

SYSTEMS AND METHODS FOR IMAGE CLASSIFICATION

RELATED APPLICATION

This Application is a continuation of U.S. patent application Ser. No. 17/183,321 titled SYSTEMS AND METHODS FOR IMAGE CLASSIFICATION filed on Feb. 23, 2021, which is a continuation of U.S. patent application Ser. No. 16/778,179 titled "SYSTEMS AND METHODS FOR IMAGE CLASSIFICATION" filed on Jan. 31, 2020, which claims priority to U.S. Provisional Patent Application No. 62/799,936 titled "CLASSIFICATION AND DISEASE LOCALIZATION IN HISTOPATHOLOGY USING ONLY GLOBAL LABELS: A WEAKLY-SUPERVISED APPROACH" filed on Feb. 1, 2019, the entire contents of which are incorporated herein by reference.

FIELD OF INVENTION

This invention relates generally to machine learning and computer vision and more particularly to image processing and classification.

BACKGROUND OF THE INVENTION

Histopathological image analysis (HIA) is a critical element of diagnosis in many areas of medicine, and especially in oncology, where this type of image analysis currently defines a gold standard metric. Recent works have sought to leverage modern developments in machine learning (ML) to aid pathologists in disease detection tasks, but the majority of these techniques require localized annotation masks as training data. These localized annotations are even more costly to obtain than the original diagnosis, because pathologists must spend time to assemble pixel-by-pixel segmentation maps of diseased tissue at extreme resolution. Thus, HIA datasets with annotations are very limited in size. Additionally, such localized annotations may not be available when facing new problems in HIA, such as new disease subtype classification, prognosis estimation, or drug response prediction. The critical question for HIA is: can one design a learning architecture which achieves accurate classification without localized annotation? A successful technique should be able train algorithms to assist pathologists during analysis and could also be used to identify previously unknown structures and regions of interest.

Indeed, while histopathology is the gold standard diagnostic in oncology and other disorders, it is extremely costly, requiring many hours of focus from pathologists to make a single diagnosis. Additionally, as correct diagnosis for certain diseases requires pathologists to identify a few cells out of millions, these tasks are akin to "finding a needle in a haystack." Hard numbers on diagnostic error rates in histopathology are difficult to obtain, being dependent upon the disease and tissue in question as well as self-reporting by pathologists of diagnostic errors. However, false negatives in cancer diagnosis can lead not only to catastrophic consequences for the patient, but also to incredible financial risk to the pathologist. Any tool which can aid pathologists to focus their attention and effort to the most suspect regions can help reduce false-negatives and improve patient outcomes through more accurate diagnoses. Medical researchers have looked to computer-aided diagnosis for decades, but the lack of computational resources and data have prevented widespread implementation and usage of such tools. Since the advent of automated digital whole slide image (WSI) capture in the 1990s, researchers have sought approaches for easing the pathologist's workload and improving patient outcomes through image processing algorithms. Rather than predicting final diagnosis, many of these procedures focused instead on segmentation, either for cell-counting, or for the detection of suspect regions in the WSI. Historical methods have focused on the use of hand-crafted texture or morphological features used in conjunction with unsupervised techniques such as K-means clustering or other dimensionality reduction techniques prior to classification via k-Nearest Neighbor or a support vector machine.

Over the past decade, fruitful developments in deep learning have led to an explosion of research into the automation of image processing tasks. While the application of such advanced machine learning (ML) techniques to image tasks has been successful for many consumer applications, the adoption of such approaches within the field of medical imaging has been more gradual. However, these techniques demonstrate remarkable promise in the field of HIA. Specifically, in digital pathology with WSI, highly trained and skilled pathologists review digitally captured microscopy images from prepared and stained tissue samples in order to make diagnoses.

SUMMARY OF THE DESCRIPTION

A method and apparatus of a device that classifies an image is described. In an exemplary embodiment, the method includes tiling at least one region of interest of the input image into a set of tiles. For each tile, the method includes extracting a feature vector of the tile by applying a convolutional neural network, wherein a feature is a local descriptor of the tile. The method also includes processing the extracted feature vectors of the set of tiles to classify the input image. In some embodiments, processing the extracted feature vectors includes computing a score of the tile from the extracted feature vector, said tile score being representative of a contribution of the tile into a classification of the input image; sorting a set of the tile scores and selecting a subset of the tile scores based on their value and/or their rank in the sorted set; and applying a classifier to the selected tile scores in order to classify the input image. In some embodiments, tiling the region of interest of the input image includes detecting the region of interest using masks, for example, generated using Otsu's method applied to the hue and saturation channels after transformation of the input image into hue, saturation, value (HSV) color space. In some embodiments, tiling the region of interest of the input image includes normalizing colors of the input image, for example, by applying a left-shift to RGB channels of the input image and rescaling between two given values. In some embodiments, the tiling includes applying a fixed tiling grid to at least the region of interest, wherein each of the set of tiles has a predetermined size. In some embodiments, the convolutional neural network is a ResNet-50 type of residual neural network with a last layer removed using a previous layer as output. In some embodiments, for each tile, the score of the tile is computed by applying a one-dimensional convolutional layer to the extracted feature vector of the tile. In some embodiments, the classifier is a multi-layer perceptron classifier, in particular including two fully connected layers. In some embodiments, the input image is a histopathology slide, the region of interest is a tissue region, and the classification of the image is a diagnosis classification. In some embodiments, a first given number, $R_{top}$, of the highest values of the tile scores and a second given number, $R_{bottom}$, of the smallest values of the tile scores are selected at the sorting and selecting operation.

According to another aspect of the present disclosure, a non-transitory computer readable medium is disclosed with a memory storing code instructions which, when executed by a processor, cause the processor to perform operations for classifying an input image described above.

According to another aspect of the present disclosure, a method for predicting a global score of an input image is disclosed. The method includes tiling a region of interest of the input image into a set of tiles. For each tile, the method includes extracting a feature vector of the tile by applying a convolutional neural network, wherein a feature is a local descriptor of the tile. The method also includes processing the extracted feature vectors of the set of tiles to obtain the global score of the input image. In some embodiments, processing the extracted feature vectors includes computing a score of the tile from the extracted feature vector, where the tile score is representative of a contribution of the tile into the global score of the input image; sorting a set of the tile scores and selecting a subset of the tile scores based on their value and/or their rank in the sorted set; and applying a regressor to the kept tile scores in order to obtain the global score of the input image. In some embodiments, tiling the region of interest of the input image includes detecting the region of interest using masks, for example, by generating a mask using Otsu's method applied to hue and saturation channels after transformation of the input image into hue, saturation, value (HSV) color space. In some embodiments, tiling the region of interest of the input image includes normalizing colors of the input image, for example, by applying a left-shift to RGB channels of the input image and rescaling it between two given values. In some embodiments, the tiling includes applying a fixed tiling grid to at least the region of interest, wherein each of the set of tiles has a predetermined size. In some embodiments, the convolutional neural network is a ResNet-50 type of residual neural network with a last layer removed using a previous layer as output. In some embodiments, for each tile, the score of the tile is computed by applying a one-dimensional convolutional layer to the extracted feature vector of the tile. In some embodiments, the regressor is a multi-layer perceptron regressor including two fully connected layers. In some embodiments, the input image is a histopathology slide, the region of interest is a tissue region, and the global score is a risk score correlated with a prognosis, or correlated with a response to a treatment. In some embodiments, a first given number, $R_{top}$, of a highest value of the tile scores and a second given number, $R_{bottom}$, of a smallest value of the tile scores are selected at the sorting and selecting operation.

According to another aspect of the present disclosure, a non-transitory computer readable medium is disclosed with a memory storing code instructions which, when executed by a processor, cause the processor to perform operations for predicting a global score of an input image described above.

Other methods and apparatuses are also described.

BRIEF DESCRIPTION OF THE DRAWINGS

The present invention is illustrated by way of example and not limitation in the figures of the accompanying drawings in which like references indicate similar elements. The patent or application file contains at least one drawing executed in color. Copies of this patent or patent application publication with color drawing(s) will be provided by the Office upon request and payment of the necessary fee.

The present invention is illustrated by way of example and not limitation in the figures of the accompanying drawings in which like references indicate similar elements.

DETAILED DESCRIPTION

Figure 1:
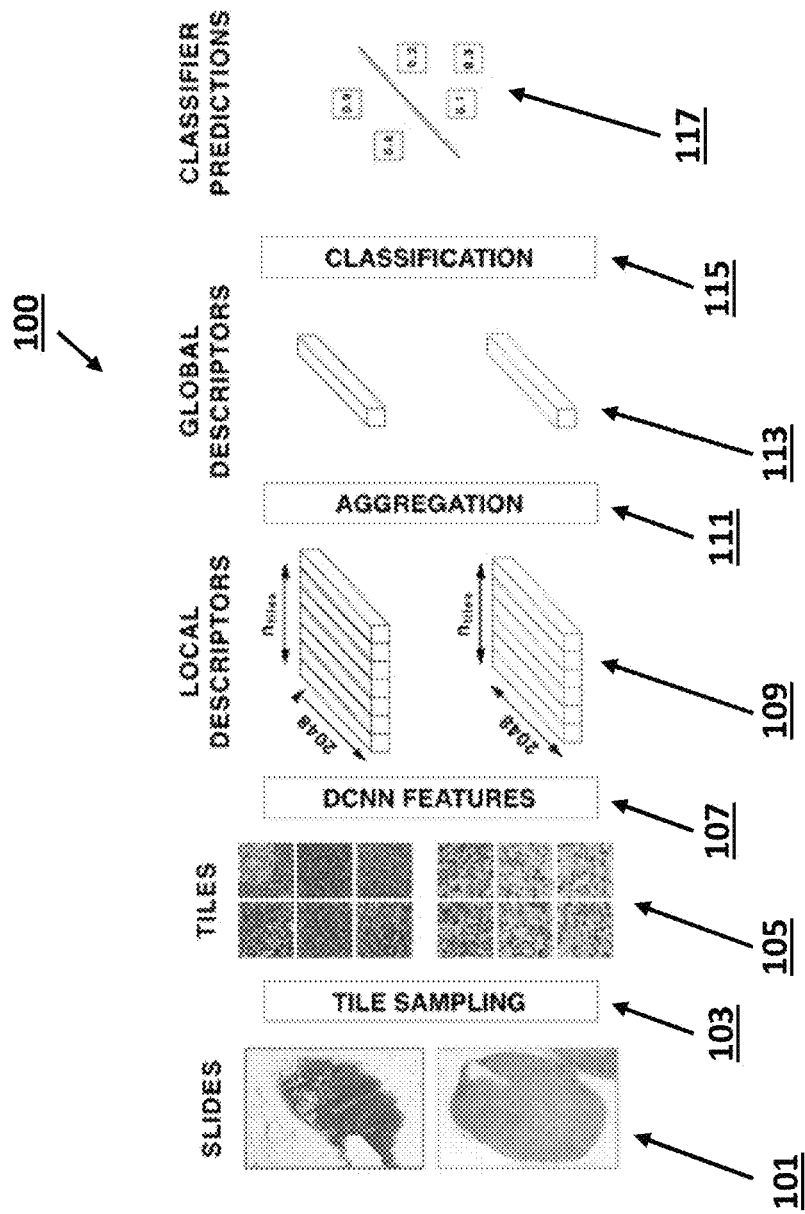
FIG. 1 is an illustration of a classification system for histopathology image classification.

A method and apparatus of a device that classifies an image is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

From this disclosure, it should be understood that the invention is not limited to the examples described herein. Indeed, the methods and techniques disclosed herein can be applied to any kind of inputted image, for the task of either classification or predicting a global score, in any technical field requiring semantic segmentation of large images.

In the context of medicine, and more particularly oncology, one embodiment of the present disclosure aims at providing various diagnosis information to a pathologist. Thus, said input image can be a histopathology slide (WSI), but any visual representation of a body part using medical imaging technology can be used.

As used herein, the "region of interest" of an image could be any region semantically relevant for the task to be performed, in particular regions corresponding to tissues, organs, bones, cells, body fluids, etc. when in the context of histopathology.

As used herein, classifying an image describes associating to a particular image a label from a predetermined list of labels. In the context of histopathology, the classification could be a diagnosis classification. In one embodiment, the classification can be binary, e.g., the labels are simply "healthy"/"not healthy." In another embodiment, there could be more than two labels, for example labels corresponding to different diseases, labels corresponding to different stages of a disease, labels corresponding to different kinds of diseased tissue, etc.

As used herein, predicting a global score of an image describes calculating a single value representative of a meaningful quantity of the image. In the context of histopathology, a global score could be a risk score correlated with prognosis (e.g. a survival rate, a survival expectancy, etc.), a risk score correlated with response to a treatment (i.e. the probability of a treatment to be effective, a variation of expectancy, etc.), or any significant parameter for diagnosis.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in a different order. Moreover, some operations may be performed in parallel rather than sequentially.

The terms "server," "client," and "device" are intended to refer generally to data processing systems rather than specifically to a particular form factor for the server, client, and/or device.

Analysis of histopathology slides is a critical step for many diagnoses, and in particular in oncology where it defines the gold standard. In the case of digital histopathological analysis, highly trained pathologists must review vast WSIs of extreme digital resolution ($100,000^2$ pixels) across multiple zoom levels in order to locate abnormal regions of cells, or in some cases single cells, out of millions. The application of deep learning to this problem is hampered not only by small sample sizes, as typical datasets contain only a few hundred samples, but also by the generation of ground-truth localized annotations for training interpretable classification and segmentation models. According to one embodiment of the present disclosure, a method for disease localization in the context of weakly supervised learning is disclosed, where only image-level labels are available during training. Even without pixel-level annotations, performance was demonstrated comparable with models trained with strong annotations on the Camelyon-16 lymph node metastases detection challenge. In some embodiments, this is accomplished through the use of pre-trained deep convolutional networks, feature embedding, as well as learning via top instances and negative evidence, a multiple instance learning technique from the field of semantic segmentation and object detection. Since localized annotations may be very difficult to obtain, datasets may only contain WSI-level diagnosis labels, falling into the category of weakly-supervised learning (WSL).

In some embodiments, the use of deep convolutional neural networks (DCNNs) can train a model for mitosis detection in Haemotoxylin and Eosin (H&E) stained images. Similar techniques can also be applied two WSI for the detection of invasive ductal carcinoma. These approaches demonstrate the usefulness of learned features as an effective replacement for hand-crafted image features. It is possible to train deep architectures from scratch for the classification of tile images. However, training such DCNN architectures can be extremely resource intensive. For this reason, many recent approaches applying DCNNs to HIA make use of large pre-trained networks to act as rich feature extractors for tiles. Such approaches have found success as aggregation of rich representations from pre-trained DCNNs has proven to be quite effective, even without from—scratch training on WSI tiles.

According to one embodiment of the present disclosure, a technique is proposed for the interpretable prediction of general localized diseases in WSI with weak, whole-image disease labels and without any additional expert-produced localized annotations, i.e. per-pixel segmentation maps, of diseased areas within the WSI. To accomplish this, an existing architecture from the field of multiple instance learning and object region detection can be modified for WSI diagnosis prediction. By modifying the pre-trained DCNN model, introducing an additional set of fully-connected layers for context-aware classification from tile instances, developing a random tile sampling scheme for efficient training over massive WSI, and enforcing a strict set of regularizations, performance equivalent to the best human pathologists can be achieved. Notably, while the approach proposed herein makes use of a pre-trained DCNN as a feature extractor, the entire procedure is a true end-to-end classification technique, and therefore the transferred pre-trained layers can be fine-tuned to the context of H&E WSI.

In some embodiments, using whole-slide labels, performance was achieved comparable to top-10 ranked methods trained with strong, pixel-level labels on the Camelyon-16 challenge dataset, while also producing disease segmentation that closely matches ground-truth annotations. Results are also presented herein for diagnosis prediction on WSI obtained from The Cancer Genome Atlas (TCGA), where strong annotations are not available and diseases may not be strongly localized within the tissue sample.

While approaches using localized annotations have shown promise for HIA, they fail to address the cost associated with the acquisition of hand-labeled datasets, as in each case these methods require access to pixel-level labels. Access to data drives innovation; however, for HIA hand-labeled segmentation maps are costly to produce, often subject to missed diseased areas, and cannot scale to the size of datasets required for truly effective deep learning. Because of these considerations, HIA is uniquely suited to the WSL setting.

In some embodiments, the WSL task for HIA includes the identification of suspect regions of WSI when the training data contains image-wide labels of diagnoses made by expert pathologists. Since WSI are often digitally processed in small patches, or tiles, the aggregation of these tiles into groups with a single label (e.g. "healthy", "cancer present") can be used within the framework of multiple instance learning (MIL). In MIL for binary classification, the standard multi-instance (SMI) assumption can be made: a bag is classified as positive if at least one instance (here, a tile) in the bag is labelled positive. The goal is to take the bag-level labels and learn a set of instance-level rules for the classification of single instances. In the case of HIA, learning such rules provides the ability to infer localized regions of abnormal cells within the large-scale WSI.

An EM-based method has been proposed for WSI classification in the WSL setting to identify discriminative patches in high resolution images automatically during patch-level convolutional neural network (CNN) training. A decision level fusion method for HIA has also been proposed, which is more robust than max-pooling and can be thought of as a Count-based Multiple Instance (CMI) learning method with two-level learning. While this approach was shown to be effective in the case of glioma classification, it slightly outperforms much simpler approaches, but at much greater computational cost.

In the case of natural images, high performance for object detection and localization for WSL with image-wide labels has been achieved. In one case, an end-to-end trainable CNN model was proposed based on MIL learning with top instances, as well as negative evidence, relaxing the SMI assumption. Specifically, in the case of semantic segmentation, a target concept might not exist just at the sub-region level, but the proportion of positive and negative samples in a bag may have a larger effect in the determination of label assignment. This argument also holds for the case of HIA, where pathologist diagnosis arises from a synthesis of observations across multiple resolution levels as well as the relative abundance of diseased cells. The techniques disclosed herein make a number of improvements on the previous frameworks, adapting them to the context of large-scale WSI for HIA.

In some embodiments, large regions of a WSI may contain no tissue at all, and are therefore not useful for training and inference. To extract tiles with content relevant to the task, Otsu's method (Otsu, 1979) can be applied to the hue and saturation channels of the image after transformation into the HSV color space to produce two masks which are then combined to produce the final tissue segmentation. Subsequently, tiles within the foreground segmentation are extracted for training and inference. Color or stain normalization is an important step in HIA, since the result of the H&E staining procedure can vary greatly between any two slides. A simple histogram equalization algorithm can be used including of left-shifting RGB channels and subsequently rescaling them to [0, 255].

The tiling operation is necessary in histopathology analysis. Indeed, due to the large size of the WSI, it is computationally intractable to process the slide in its entirety. For example, on the highest resolution zoom level, denoted as scale 0, for a fixed grid of non-overlapping tiles, a WSI may possess more than 200,000 tiles of 224×224 pixels. Because of the computational burden associated with processing the set of all possible tiles, a uniform random sampling from the space of possible tiles was analyzed. Additionally, due to the large scale nature of WSI datasets, the computational burden associated with sampling potentially overlapping tiles from arbitrary locations was a prohibitive cost for batch construction during training.

According to one embodiment of the present disclosure, tiles from the non-overlapping grid are processed and stored to disk prior to training. As the tissue structure does not exhibit any strong periodicity, sampling tiles along a fixed grid without overlapping provides a reasonably representative sampling while maximizing the total sampled area.

Given a target scale $l \in \{0, 1, \ldots, L\}$, the number of possible tiles in WSI indexed by $i \in \{1, 2, \ldots, N\}$ is denoted as $M^T_{i,l}$. The number of tiles sampled for training or inference is denoted by $M^S_{i,l}$ and is chosen according to equation (1) below:

$$M^S_{i,l} = \min\left(M^T_{i,l}, \max\left(M^T_{min}, \frac{1}{2} \cdot \overline{M^T_l}\right)\right) \quad (1)$$

where $$\overline{M^T_l} = \frac{1}{N} \sum_i M^T_{i,l}$$

is the empirical average of the number of tiles at scale l over the entire set of training data.

In one embodiment, the ResNet-50 architecture was trained on the ImageNet natural image dataset. In empirical comparisons between VGG or Inception architectures, it has been discovered that the ResNet architecture provides features well suited for HIA. Additionally, the ResNet architecture was provided at a variety of depths (ResNet-101, ResNet-152). However, it has been discovered that ResNet-50 provides a desirable balance between the computational burden of forward inference and richness of representation for HIA.

In one embodiment, the values of the ResNet-50 pre-output layer were used for every tile, a set of P=2048 floating point values, as the feature vector for the tile. Since the fixed input resolution for ResNet-50 was 224×224 pixels, the resolution for the tiles extracted from the WSI were set to the same pixel resolution at every scale l.

Baseline Method

Given a WSI, extracting tile-level features produces a bag of feature vectors which one attempts to use for classification against the known image-wide label. The dimension of these local descriptors is $M^S \times P$, where P is the number of features output from the pre-trained image DCNN and $M^S$ is the number of sampled tiles.

Approaches such as Bag-of-visual-words (BoVW) or VLAD could be chosen as a baseline aggregation method to generate a single image-wide descriptor of size P×1, but would require a huge computational power given the dimensionality of the input. Instead, two common approaches for the aggregation of local features can be tried, specifically, the MaxPool and MeanPool, and subsequently apply a classifier on the aggregated features. After applying these pooling methods over the axis of tile indices, one obtains a single feature descriptor for the whole image. Other pooling approaches have been used in the context of HIA, including Fisher vector encodings and p-norm pooling. However, as the reported effect of these aggregations is quite small, these approaches were not considered when constructing the baseline approach.

After aggregation, a classifier can be trained to produce the desired diagnosis labels given the global WSI aggregated descriptor. For the baseline method, a logistic regression was used for this final prediction layer of the model. A description of the baseline approach is presented in FIG. 1. Specifically, FIG. 1 is an illustration of a classification system 100 for histopathology image classification via aggregation of tile-level features into global slide descriptors. In FIG. 1, the classification system 100 includes the functions of tile sampling 103, applying DCNN features 107, aggregation 111, and classification 115. As shown in FIG. 1, significant portions of the slides 101 may include no tissue at all. Thus, tile sampling 103 is used to arrive at the tiles 105. DCNN features are applied 107 to arrive at the local tile-level descriptors 109. The tile-level descriptors 109 are aggregated 111 into the global descriptors, according to some embodiments. The global descriptors 113 then undergo classification 115 to arrive at the classifier predictions 117.

Chowder Method

Figure 2:
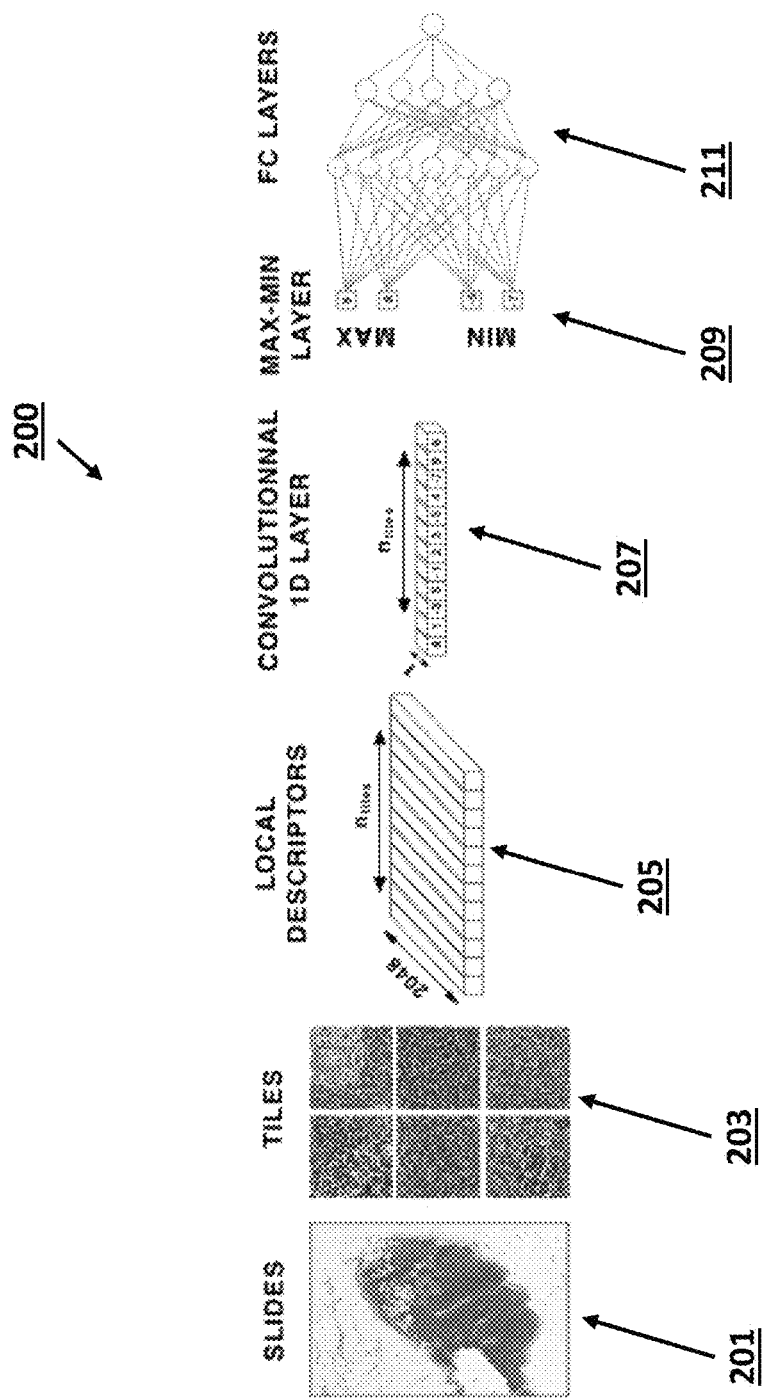
FIG. 2 illustrates an example classification system for histopathology image classification that combines both top-instances as well as negative evidence, according to embodiments of the present disclosure.

According to some embodiments of the present disclosure, an architecture is disclosed for WSI classification via multi-layer perceptron (MLP) operating on top positive and negative instances. FIG. 2 illustrates an example classification system 200 for histopathology image classification that combines both top-instances as well as negative evidence, according to embodiments of the present disclosure.

In some embodiments, it was observed that the baseline approach works well for diffuse disease, which was evidenced in the results of Table 1 for TCGA-Lung, below. Here, diffuse implies that the number of disease-containing tiles, pertinent to the diagnosis label, are roughly proportional to the number of tiles containing healthy tissue. However, if one applies the same approach to different WSI datasets, such as Camelyon-16, the performance significantly degrades. In the case of Camelyon-16, the diseased regions of most of the slides are highly localized, restricted to a very small area within the WSI. When presented with such imbalanced bags, simple aggregation approaches for global slide descriptors may overwhelm the features of the disease-containing tiles.

In FIG. 2, the classification system 200 performs tile sampling to convert the slides 201 into tiles 203. The local descriptors 205 are then identified from the tiles. Rather than creating a global slide descriptor by aggregating all tile features, instead a MIL approach was used that combines both top-instance as well as negative evidence.

First, a set of one-dimensional embeddings for the P=2048 ResNet-50 features are calculated via J one-dimensional convolutional layers strided across the tile index axis. For tile t with features $k_t$, the embedding according to kernel j was calculated as $e_{j,t}=(w_j, k_t)$. Notably, the kernels $w_j$ have dimensionality P. This one-dimensional convolution 207 is, in essence, a shortcut for enforcing a fully-connected layer with tied weights across tiles, i.e. the same embedding for every tile. It has been discovered that the use of a single embedding, J=1, was an appropriate choice for WSI datasets when the number of available slides was small (<1000). In this case, choosing J>1 may decrease training error, but may increase generalization error. Avoiding overtraining and ensuring model generality remains a major challenge for the application of WSL to WSI datasets.

After feature embedding, a vector $M^S_{l,i} \times 1$ of local tile-level (instance descriptors). These instance descriptors are sorted by value. Of these sorted embedding values, the top and bottom R entries are retained, resulting in a tensor of $2R \times 1$ entries to use for diagnosis classification. This can be easily accomplished through a MinMax layer 209 on the output of the one-dimensional convolution layer. The purpose of this layer was to take not the top instances region but also the negative evidences, that is the region which best supports the absence of the class. During training, the back-propagation runs through the selected tiles, positive and negative evidences. When applied to WSI, the MinMax serves as a powerful tile selection procedure. In one embodiment, a MLP was used with two fully connected (FC) layers 211 of 200 and 100 neurons with sigmoid activations. Using these fully connected layers 211 as the final classifier may provide richer interactions between the top and bottom instances, in some embodiments.

EXAMPLES

In one embodiment, for pre-processing, a single tile scale was fixed for all methods and datasets. A fixed zoom level of 0.5 µm/pixel was chosen, which corresponds to l=0 for slides scanned at 20× magnification, or l=1 slides scanned at 40× magnification. Next, since WSI datasets often contain a few hundred images, far from the millions images of ImageNet dataset, strong regularization was required to prevent over-fitting. A $l_2$-regularization of 0.5 was applied on the convolutional feature embedding layer, and dropout on the MLP with a rate of 0.5. However, these values may not be the global optimal, as no hyper-parameter optimization was applied to tune these values. In some embodiments, the model parameters may be optimized to minimize the binary cross-entropy loss over 30 epochs with a mini-batch size of 10 and with learning rate of 0.001.

To reduce variance and prevent over-fitting, an ensemble of E CHOWDER networks was trained which differ by their initial weights. The average of the predictions made by these E networks established the final prediction. Although E=10 for the results presented in Table 1, a larger ensemble of E=50 with R=5 was used to obtain an improved possible model and compare with the CHOWDER method to those presented in Table 2. An ensemble of E=10 was used when reporting the results for WELDON, in Table 1. As the training of one epoch requires about 30 seconds on available hardware, the total training time for the ensemble took just over twelve hours. While the ResNet-50 features were extracted using a GPU for efficient feed-forward calculations, the CHOWDER network was trained on a CPU in order to take advantage of larger system RAM sizes, compared to on-board GPU RAM. This allows for storage of all the training tiles in memory to provide faster training compared to a GPU, due to reduced transfer overhead.

The public Cancer Genome Atlas (TCGA) provided approximately 11,000 tissue slides images of cancers of various organs. In one experiment, 707 lung cancer WSIs (TCGA-Lung) were selected, which were downloaded in March 2017. Subsequently, a set of new lung slides have been added to TCGA, increasing the count of lung slides to 1,009. Along with the slides themselves, TCGA also provided labels representing the type of cancer present in each WSI. However, no local segmentation annotations of cancerous tissue regions were provided. The pre-processing step extracted 1,411,043 tiles and their corresponding representations from ResNet-50. The task of these experiments was then to predict which type of cancer was contained in each WSI: adenocarcinoma or squamous cell carcinoma. In some embodiments, the quality of the classification was also evaluated according to the area under the curve (AUC) of the receiver operating characteristic (ROC) curve generated using the raw output predictions.

As expected in the case of diffuse disease, the advantage provided by CHOWDER was slight as compared to the MeanPool baseline, as evidenced in Table 1. Additionally, as the full aggregation techniques worked quite well in this setting, the value of R did not seem to have a strong effect on the performance of CHOWDER as it increased to R=100. In this setting of highly homogenous tissue content, the global aggregate descriptors may be able to effectively separate the two classes of carcinoma.

For the second experiment, the Camelyon-16 challenge dataset3 was used, which consisted of 400 WSIs taken from sentinel lymph nodes, which are either healthy or exhibit metastases of some form. In addition to the WSIs themselves, as well as their labeling (healthy, contains-metastases), a segmentation mask was provided for each WSI that represented an expert analysis on the location of metastases within the WSI. Human labeling of sentinel lymph node slides is known to be quite tedious. Teams participating in the challenge had access to, and utilized, the ground-truth masks when training their diagnosis prediction and tumor localization models. In some embodiments, the CHOWDER approach set aside the masks of metastasis locations and utilizes diagnosis labels. Furthermore, many participating teams developed a post-processing step, extracting hand-crafted features from predicted metastasis maps to improve their segmentation. In some embodiments, no post-processing was performed for the presented CHOWDER results, and the score was computed directly from the raw output of the CHOWDER model.

TABLE 1

| Method | AUC | |
|---|---|---|
| | CV | Competition |
| BASELINE | | |
| MaxPool | 0.749 | 0.655 |
| MeanPool | 0.802 | 0.530 |
| WELDON | | |
| R = 1 | 0.782 | 0.765 |
| R = 10 | 0.832 | 0.670 |
| R = 100 | 0.809 | 0.600 |
| R = 300 | 0.761 | 0.573 |
| CHOWDER | | |
| R = 1 | 0.809 | 0.821 |
| R = 5 | 0.903 | 0.858 |
| R = 10 | 0.900 | 0.843 |
| R = 100 | 0.870 | 0.775 |
| R = 300 | 0.837 | 0.652 |

| Method | AUC |
|---|---|
| BASELINE | |
| MaxPool | 0.860 |
| MeanPool | 0.903 |
| CHOWDER | |
| R = 1 | 0.900 |
| R = 10 | 0.915 |
| R = 100 | 0.909 |

Table 1 illustrates classification (AUC) results for the Camelyon-16 (left) and TCGA-Lung (right) datasets for CHOWDER, WELDON, and the baseline approach. For Camelyon-16, two scores are presented, one for the fixed competition test split of 130 WSIs, and one for a cross-validated average over 3 folds (CV) on the 270 training WSIs. For TCGA-Lung, scores are presented as a cross-validated average over 5 folds.

The Camelyon-16 dataset was evaluated on two different axes. First, the accuracy of the predicted label for each WSI in the test set is evaluated according to AUC. Second, the accuracy of metastasis localization was evaluated by comparing model outputs to the ground-truth expert annotations of metastasis location. This segmentation accuracy was measured according to the free ROC metric (FROC), which was the curve of metastasis detection sensitivity to the average number of also positives. As in the Camelyon challenge, the FROC metric was evaluated as the average detection sensitivity at the average false positive rates 0.25, 0.5, 1, 2, 4, and 8.

In another embodiment, a set of experiments was conducted on Camelyon-16 using random train-test cross-validation (CV) splits, respecting the same training set size as in the original competition split. In this embodiment, there was a distinct difference in AUC between the competition split and those obtained via random folds. This discrepancy was especially distinct for the MeanPool baseline, as reported in Table 1. Thus, there can be a distinct discrepancy in the data distribution between the competition test and training splits. Notably and in one embodiment, using the MeanPool baseline architecture, the competition train-test split was predicted with an AUC of 0.75; however, an AUC of 0.55 was obtained when using random splits. Because this distribution mismatch in the competition split could produce misleading interpretations, the 3-fold average CV results was reported along with the results obtained on the competition split.

In Table 1, the classification performance is illustrated for the CHOWDER method, for E=10, as compared to both the baseline aggregation techniques, as well as the WELDON approach. In the case of WELDON, the final MLP was not used and instead a summing was applied to the MinMax layer. The value of R retains the same meaning in both cases: the number of both high and low scoring tiles to pass on to the classification layers. A range of values R was tested for both WELDON and CHOWDER. In one embodiment, over all values of R, CHOWDER provided a significant advantage over both the baseline aggregation techniques as well as WELDON. In addition, the optimal performance was obtained without using a large number of discriminative tiles, i.e. R=5.

Figure 3A:
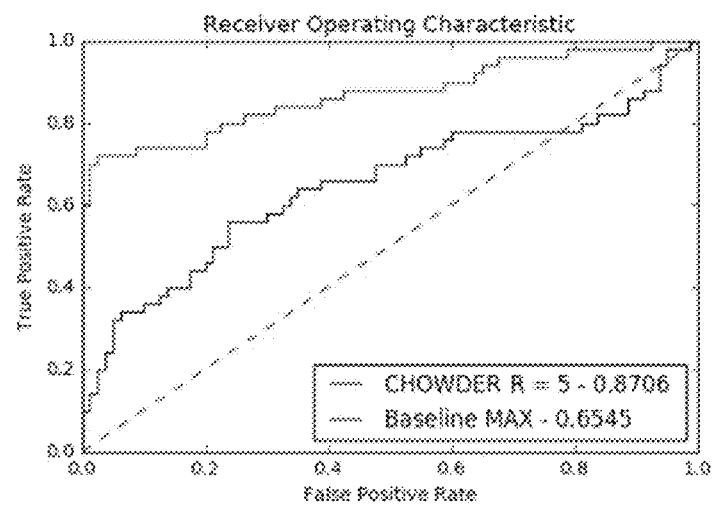
FIGS. 3A-3B illustrate graphs of the performance curves for the Camelyon-16 dataset for both classification and segmentation tasks, according to embodiments of the present disclosure.
Figure 3B:
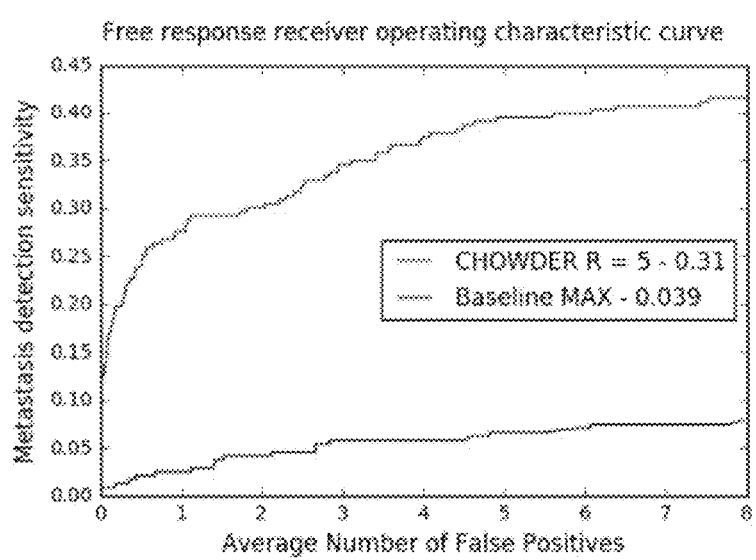

Illustrated in Table 2 is a performance as compared to the public Camelyon leader boards for E=50. In this case, the CHOWDER method was able to obtain an effective 11th place rank, but without using any of the ground-truth disease segmentation maps. This is a remarkable result, as the winning approach required tile-level disease labels derived from expert-provided annotations in order to train a full 27-layer GoogLeNet architecture for tumor prediction. In addition, the ROC curve is shown for this result in FIGS. 3A-3B. FIGS. 3A-3B illustrate graphs of the performance curves for Camelyon-16 dataset for both classification and segmentation tasks, according to an embodiment of the present disclosure. FIG. 3A illustrates the ROC curves for the classification task, while FIG. 3B illustrates the FROC curves for a lesion detection task.

TABLE 2

| Rank | Team | AUC | Rank | Team | FROC |
|---|---|---|---|---|---|
| 1 | HMS & MIT | 0.9935 | 1 | HMS & MIT | 0.8074 |
| 2 | HMS-MGH | 0.9763 | 2 | HMS-MGH | 0.7600 |
| 3 | HMS-MGH | 0.9650 | 3 | HMS-MGH | 0.7289 |
| 4 | CUHK | 0.9415 | 4 | CUHK | 0.7030 |
| | . . . | | | . . . | |
| 9 | CUHK | 0.9056 | 16 | Osaka University | 0.3467 |
| 10 | DeepCare Inc. | 0.8833 | 17 | SIT | 0.3385 |
| | CHOWDER (No Annotation) | 0 8706 | | CHOWDER (No Annotation) | 0 3103 |

TABLE 2-continued

| Rank | Team | AUC | Rank | Team | FROC |
|---|---|---|---|---|---|
| 11 | Indep. DE | 0.8654 | 18 | Warwick-QU | 0.3052 |
| 12 | METU | 0.8642 | 19 | U. Munich (CAMP) | 0.2733 |
| ... | | | ... | | |
| 32 | Sorbonne LIB | 0.5561 | 32 | Mines Paris Tech | 0.0970 |

Table 2 illustrates final leader boards for the Camelyon-16 competition. All competition methods had access to the full set of strong annotations for training their models. In one embodiment, the proposed approach utilized image-wide diagnosis levels and obtained comparable performance as top-10 methods.

In one embodiment, CHOWDER's performance on this task roughly was equivalent to the best-performing human pathologist, an AUC of 0.884, and better than the average human pathologist performance, an AUC of 0.810. Notably, this human-level performance was achieved without human assistance during training, beyond the diagnosis labels themselves.

Here, CHOWDER was able to very accurately localize the tumorous region in the WSI even though CHOWDER has been trained using global slide-wide labels and without any local annotations. While some potential false detections can occur outside of the tumor region, in one embodiment, the strongest response can occur within the tumor region itself, and follows the border regions nicely.

Furthermore, FROC scores for CHOWDER are presented in Table 2 as compared to the leader board results. Here, CHOWDER results were comparable to the 18th rank. However, this performance was incredibly significant as all other approaches were making use of tile-level classification in order to train their segmentation techniques.

Obtaining high performance in terms of whole slide classification is well and good, but it may not be helpful without an interpretable result which can be used by pathologists to aid their diagnosis. For example, the Mean-Pool baseline aggregation approach provides no information during inference from which one could derive tumor locations in the WSI: all locality information is lost with the aggregation. With MaxPool, one at least retains some information via the tile locations which provide each maximum aggregate feature.

In one embodiment, for CHOWDER, the full set of outputs from the convolutional feature embedding layer can be used. These were then sorted and thresholded according to value $\tau$ such that tiles with an embedded value larger than $\tau$ were classified as diseased and those with lower values are classified as healthy. An example of disease localization produced by CHOWDER is illustrated in FIGS. 4A-4B below.

Figure 4A:
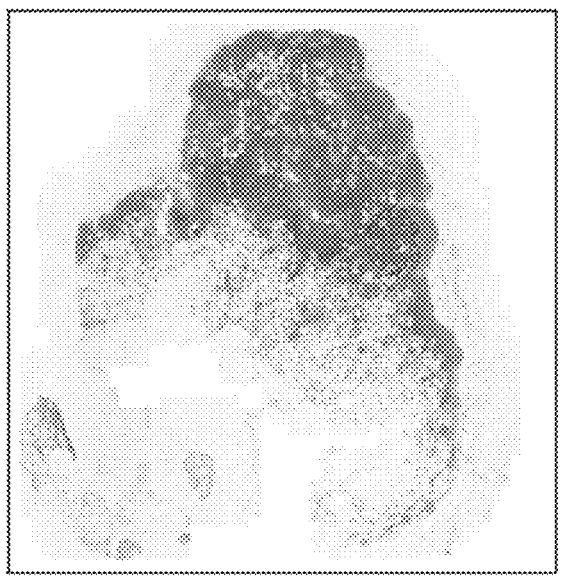
FIGS. 4A-4B illustrate visualizations of metastasis detection on a test image, according to embodiments of the present disclosure.
Figure 4B:
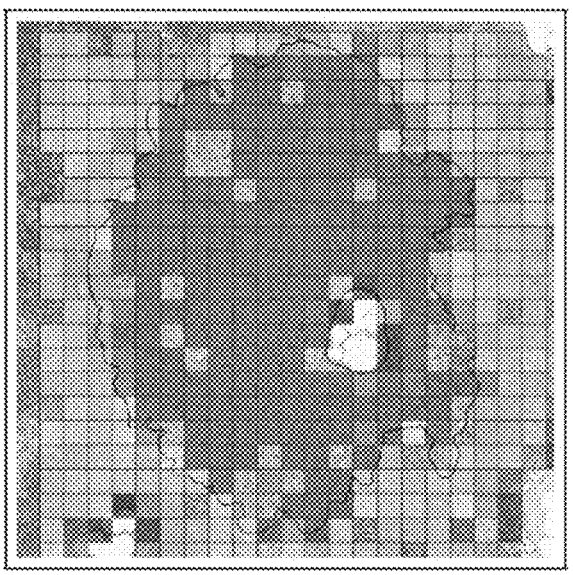

FIGS. 4A-4B illustrate visualizations of metastasis detection on a test image, according to embodiments of the present disclosure. FIG. 4A illustrates a full WSI at zoom level 6 with ground truth annotation of metastases shown via black border. Tiles with positive feature embeddings are shaded, with light tiles representing the smallest magnitude. FIG. 4B illustrates a detail of metastases at zoom level 2 overlaid with classification output via CHOWDER. Here, the output of all tested tiles are shown and colored according to their values.

In one embodiment, using stale-of-the-art techniques from MIL in computer vision, such as the top instance and negative evidence approach, an effective technique for diagnosis prediction and disease location was constructed for WSI in histopathology without the need for expensive localized annotations produced by expert pathologists. By removing this requirement, this may accelerate the production of computer-assistance tools for pathologists to greatly improve the turn-around time in pathology labs and help surgeons and oncologists make rapid and effective patient care decisions. This also opens the way to tackle problems where expert pathologists may not know precisely where relevant tissue is located within the slide image, for instance for prognosis estimation or prediction of drug response tasks. Using the suggested localization from CHOWDER, one may considerably speed up the process of obtaining ground-truth localized annotations.

In the embodiments disclosed herein, the raw values from convolutional embedding layer were used, which means that the resolution of the produced disease localization map was fixed to that of the sampled tiles. However, one could also sample overlapping tiles and then use a data fusion technique to generate a final localization map. Additionally, as a variety of annotations may be available, CHOWDER could be extended to the case of heterogeneous annotation, e.g. some slides with expert-produced localized annotations and those with whole-slide annotations.

Figure 5:
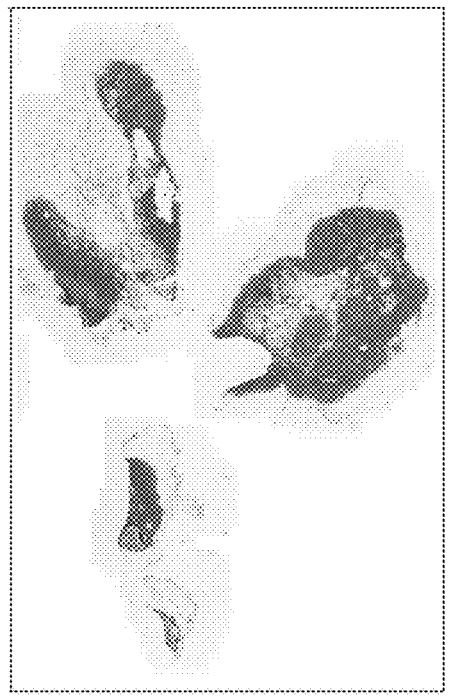
FIG. 5 illustrates a full WSI at zoom level 6 of test image 2 of the Camelyon-16 dataset, according to embodiments of the present disclosure.

FIG. 5 illustrates a full WSI at zoom level 6 of test image 2 of the Camelyon-16 dataset using CHOWDER. The ground truth annotation of metastases is shown in FIG. 5 with a black border. Tiles with positive feature embeddings are colored according to their magnitude.

Figure 6A:
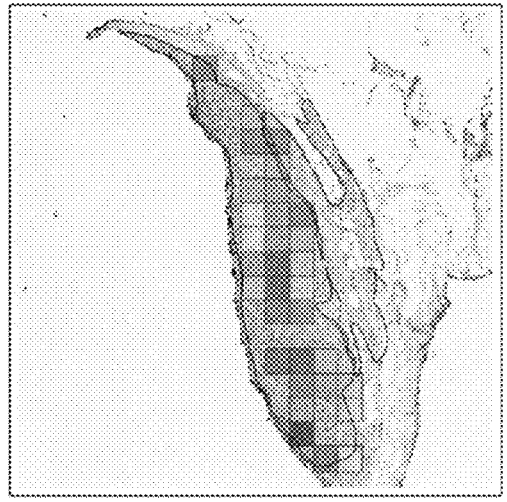
FIGS. 6A-6C illustrate details of metastases at zoom level 2 of the Camelyon-16 dataset, according to embodiments of the present disclosure.
Figure 6B:
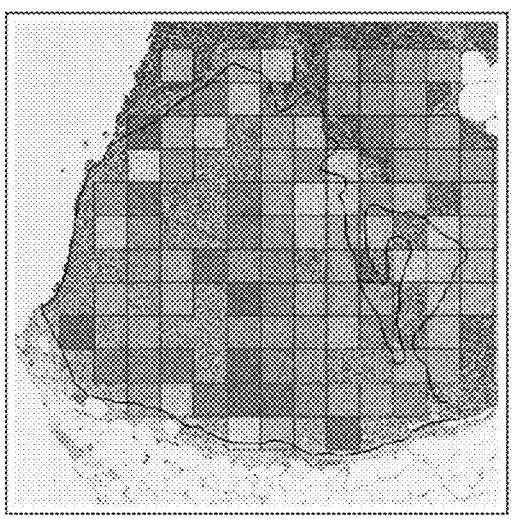
Figure 6C:
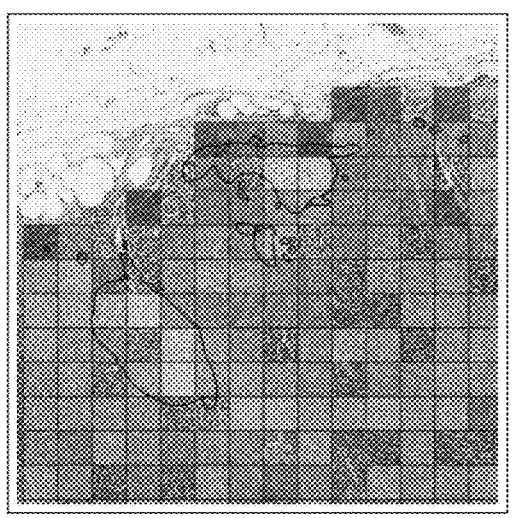

FIGS. 6A-6C illustrate details of metastases at zoom level 2 overlaid with classification output of CHOWDER. The output of all tested tiles is shown and colored according to their value. Tiles without color were not included when randomly selecting tiles for inference.

Figure 7A:
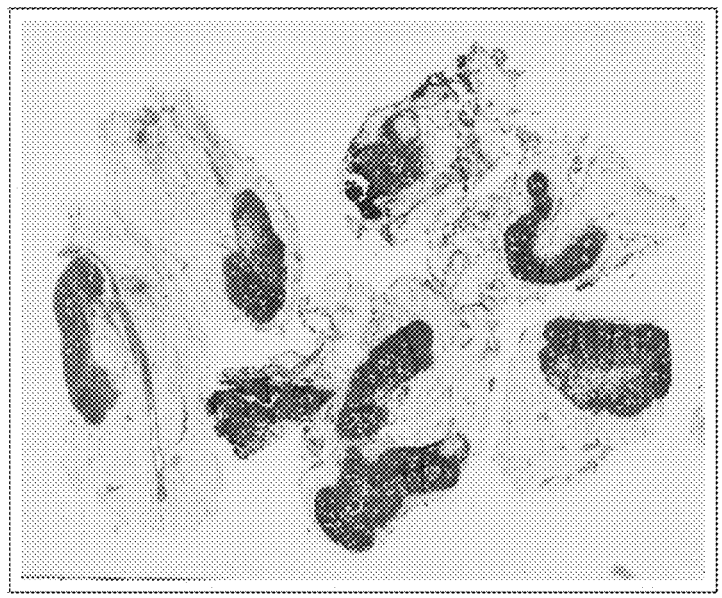
FIG. 7A illustrates a full WSI at zoom level 6 of metastasis detection on test image 92 of the Camelyon-16 dataset, according to embodiments of the present disclosure.
Figure 7B:
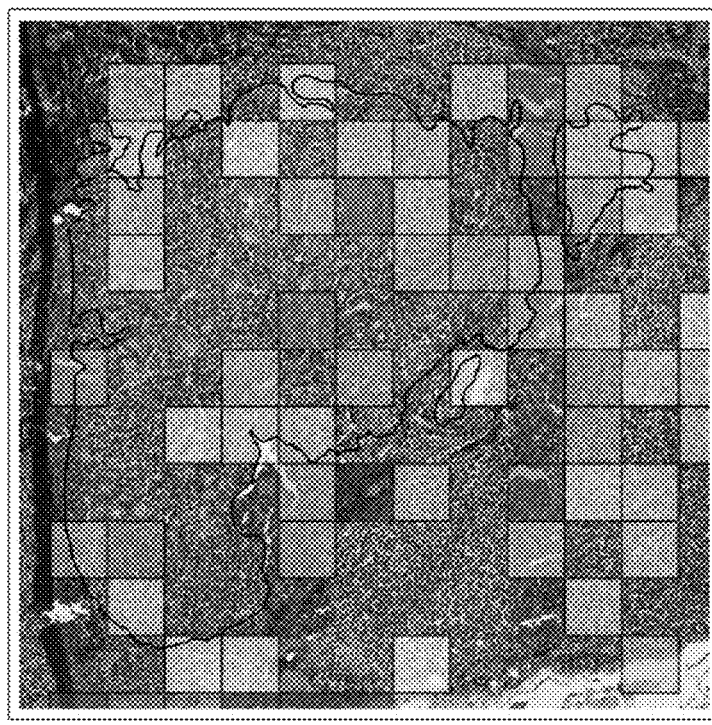
FIG. 7B illustrates a detail of metastases detection at zoom level 2 on test image 92 of the Camelyon-16 dataset, according to embodiments of the present disclosure.

FIG. 7A illustrates a full WSI at zoom level 6 of metastasis detection on test image 92 of the Camelyon-16 dataset, according to embodiments of the present disclosure. FIG. 7B illustrates a detail of metastases detection at zoom level 2 on test image 92 of the Camelyon-16 dataset, according to embodiments of the present disclosure. In FIG. 7A, ground truth annotation of metastases is shown via black border. Tiles with positive feature embeddings are colored or shaded according to their magnitude. In FIG. 7B, the metastases at zoom level 2 is overlaid with classification output from CHOWDER. Here, the output of all tested tiles are shown and shaded according to their value. Tiles without color were not included when randomly selecting tiles for inference.

Figure 8:
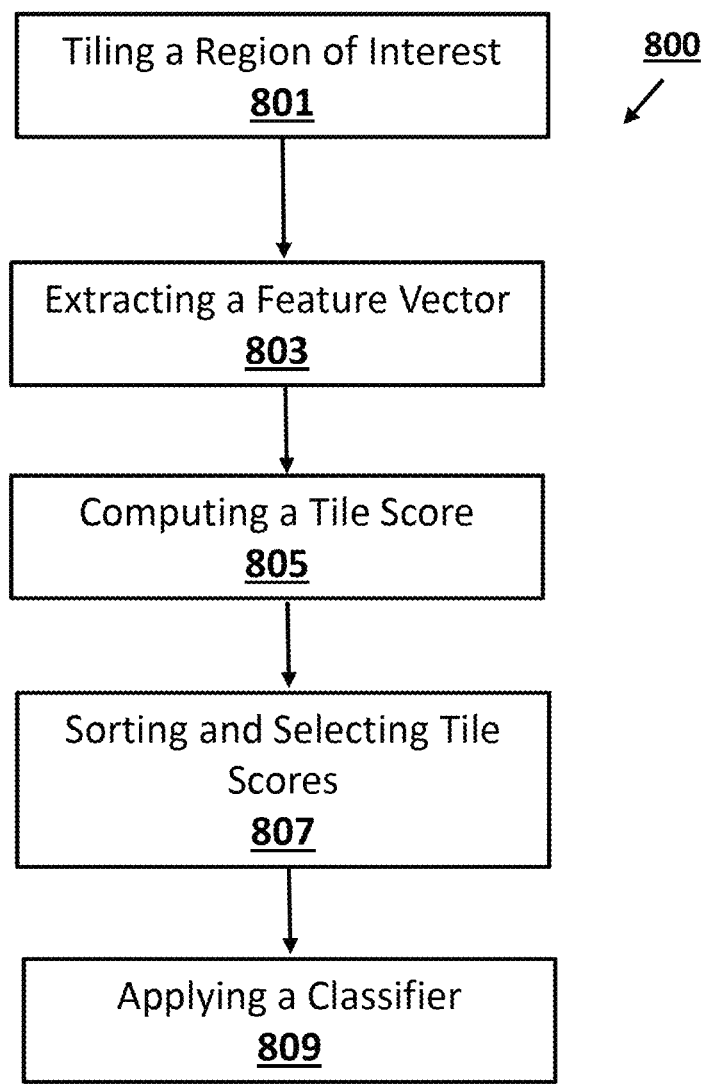
FIG. 8 is a flow diagram of one embodiment of a process for classifying an input image, according to embodiments of the present disclosure.

FIG. 8 is a flow diagram of one embodiment of a process 800 for classifying an input image, according to embodiments of the present disclosure. In FIG. 8, process 800 begins with tiling a region of interest of the input image into a set of tiles at operation 801. In some embodiments, tiling the region of interest includes detecting at least one region of interest using masks. In some embodiments, the tiles can be generated using Otsu's method applied to the hue and saturation channels after transformation of the input image into hue, saturation, value (HSV) color space. In some embodiments, tiling the region of interest includes normalizing colors of the input image by applying a left-shift to RGB channels of the input image and rescaling between two given values. In some embodiments, the tiling includes applying a fixed tiling grid to at least the region of interest, wherein each of the set of tiles has a predetermined size.

For each tile, the process performs at least the following operations. At operation 803, process 800 extracts a feature vector of the tile by applying a convolutional neural network. In some embodiments, a feature is a local descriptor of the tile. At operation 805, process 800 computes a tile score from the extracted feature vector. The tile score can be representative of a contribution of the tile into a classification of the input image. In some embodiments, the convolutional neural network is a residual neural network, such as a ResNet-50 residual neural network with a last layer removed using a previous layer as output. In some embodiments, for each tile, process 800 computes the score of the tile by applying at least one one-dimensional convolutional layer to the extracted feature vector of the tile.

At operation 807, process 800 sorts a set of the tile scores, and selects a subset of the tile scores based on at least their value and/or their rank in the sorted set. In some embodiments, a first given number, $R_{top}$, of the highest values of the tile scores and a second given number, $R_{bottom}$, of the smallest values of the tile scores are selected at operation 807.

At operation 809, process 800 applies a classifier to the selected tile scores in order to classify the input image. In some embodiments, the classifier is a multi-layer perceptron classifier, such as a perceptron including two fully connected layers. In some embodiments, the input image is a histopathology slide, the region of interest is a tissue region, and the classification of the image is a diagnosis classification.

Figure 9:
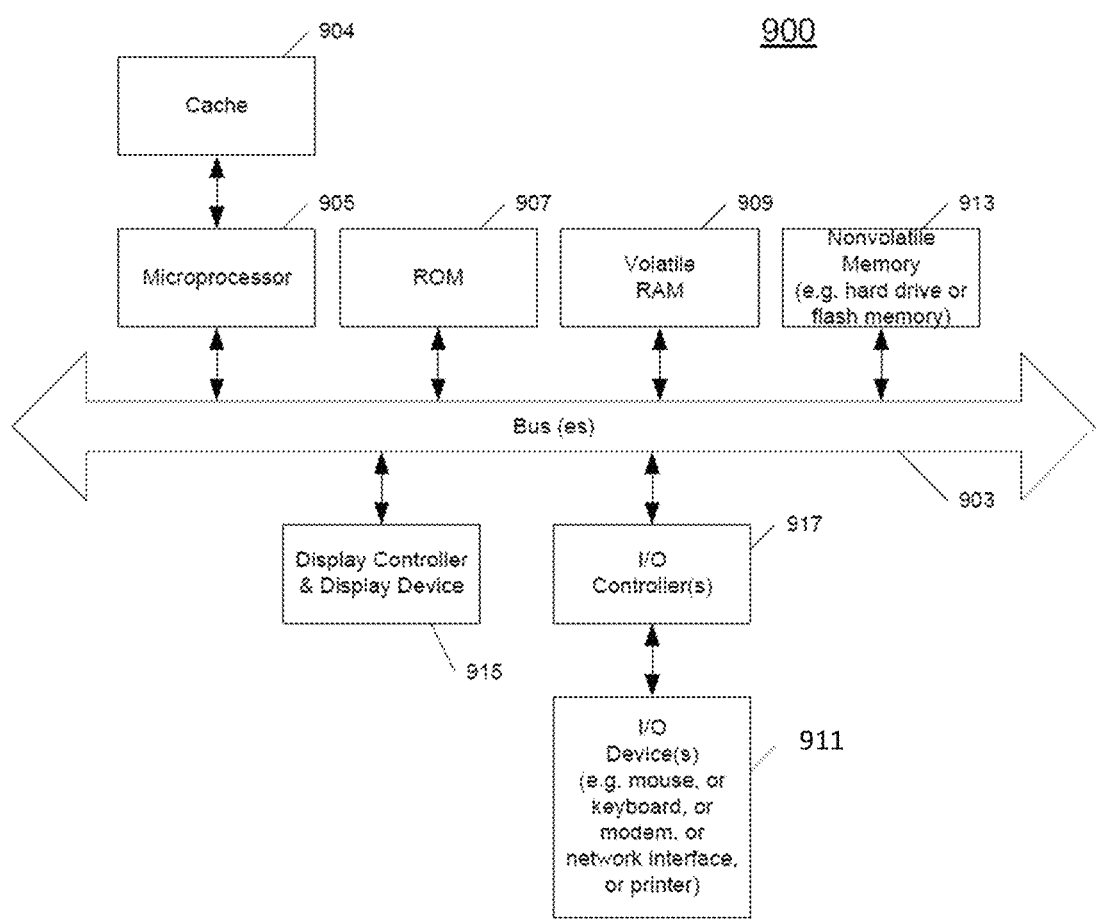
FIG. 9 illustrates one example of a computer system, which may be used in conjunction with the embodiments described herein.

FIG. 9 shows one example of a data processing system 900, which may be used with one embodiment of the present invention and to perform the methods and techniques described herein. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 913. In some embodiments, the memory 913 includes a non-transitory computer readable medium storing code instructions for the implementation of one or more portions of the methods and techniques described herein. The microprocessor 905 may include one or more CPU(s), GPU(s), a specialized processor, and/or a combination thereof. The microprocessor 905 may be in communication with a cache 904, and may retrieve the instructions from the memories 907, 909, 913 and execute the instructions to perform operations described above. The bus 903 interconnects these various components together and also interconnects these components 905, 907, 909, and 913 to a display controller and display device 915 and to peripheral devices such as input/output (I/O) devices 911 which may be mice, keyboards, modems, network interfaces, printers and other devices which are well known in the art. Typically, the input/output devices 911 are coupled to the system through input/output controllers 917. The volatile RAM (Random Access Memory) 909 is typically implemented as dynamic RAM (DRAM), which requires power continually in order to refresh or maintain the data in the memory.

The nonvolatile memory 913 can be, for example, a magnetic hard drive or a magnetic optical drive or an optical drive or a DVD RAM or a flash memory or other types of memory systems, which maintain data (e.g. large amounts of data) even after power is removed from the system. Typically, the nonvolatile memory 913 will also be a random access memory although this is not required. While FIG. 9 shows that the nonvolatile memory 913 is a local device coupled directly to the rest of the components in the data processing system, it will be appreciated that the present invention may utilize a nonvolatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "segmenting," "tiling," "receiving," "computing," "extracting," "processing," "applying," "augmenting," "normalizing," "pre-training," "sorting," "selecting," "aggregating," "sorting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method for classifying an input image comprising:
    extracting a plurality of feature vectors for a plurality of sub-images by applying a convolutional neural network; and
    processing the plurality of extracted feature vectors of the plurality of sub-images to classify the input image using a subset of sub-image scores generated for a subset of the plurality of sub-images, wherein, for the plurality of sub-images, a plurality of sub-image scores is generated from the extracted plurality of feature vectors and the subset of sub-image scores is selected from the generated plurality of sub-image scores, wherein the subset of the plurality of sub-images has a smaller number of sub-images than the plurality of sub-images; and
    applying a classifier to the selected subset of sub-image scores in order to classify the input image.

2. The method according to claim 1, wherein the classifying comprises:
    computing each sub-image score of the plurality of sub-image scores from a corresponding extracted feature vector, said sub-image score being representative of a contribution of the respective sub-image into a classification of the input image; and
    sorting the plurality of sub-image scores into a sorted set and selecting the subset of sub-image scores based on their value and/or their rank in the sorted set.

3. The method according to claim 2, wherein, for each sub-image, the sub-image score is computed by applying at least one one-dimensional convolutional layer to the extracted feature vector of the sub-image.

4. The method according to claim 2, wherein said classifier is a multi-layer perceptron classifier.

5. The method according to claim 2, wherein the input image is a histopathology slide, the region of interest is a tissue region, and the classification of the image is a diagnosis classification.

6. The method according to claim 2, wherein selecting the subset of sub-image scores comprises:
    selecting a first given number, $R_{top}$, of highest values of the sub-image scores and a second given number, $R_{bottom}$, of smallest values of the sub-image scores.

7. The method according to claim 1, wherein the convolutional neural network is a ResNet-50 type of residual neural network with a last layer removed using a previous layer as output.

8. The method according to claim 1, wherein a feature is a local descriptor of the sub-image.

9. A non-transitory computer readable medium with a memory storing code instructions which, when executed by a processor, cause the processor to perform operations for classifying an input image, the operations comprising:
    extracting a plurality of feature vectors for a plurality of sub-images by applying a convolutional neural network e;
    processing the plurality of extracted feature vectors of the plurality of sub-images to classify the input image using a subset of sub-image scores generated for a subset of the plurality of sub-images, wherein, for the plurality of sub-images, a plurality of sub-image scores is generated from the extracted plurality of feature vectors and the subset of sub-image scores is selected from the generated plurality of sub-image scores, wherein the subset of the plurality of sub-images has a smaller number of sub-images than the plurality of sub-images; and
    applying a classifier to the selected subset of sub-image scores in order to classify the input image.

10. The non-transitory computer readable medium of claim 9, wherein the classifying comprises:
    computing each sub-image score of the plurality of sub-image scores from a corresponding extracted feature vector, said sub-image score being representative of a contribution of the respective sub-image into a classification of the input image; and sorting the plurality of sub-image scores into a sorted set and selecting the subset of sub-image scores based on their value and/or their rank in the sorted set.

11. The method according to claim 4, wherein the multi-layer perceptron classifier comprises two fully connected layers.

* * * * *

UNITED STATES PATENT AND TRADEMARK OFFICE
CERTIFICATE OF CORRECTION

| | | |
|---|---|---|
| PATENT NO. | : 12,175,670 B2 | Page 1 of 1 |
| APPLICATION NO. | : 18/049205 | |
| DATED | : December 24, 2024 | |
| INVENTOR(S) | : Pierre Courtiol et al. | |

It is certified that error appears in the above-identified patent and that said Letters Patent is hereby corrected as shown below:

On the Title Page

Item (72), Line 2, "Le Kremlin Bicetre" should be -- Le Kremlin-Bicêtre --.

In the Claims

At Column 17, Line 61, "work; and" should be -- work; --.

At Column 18, Line 21, "one one-dimensional" should be -- one-dimensional --.

At Column 18, Lines 46-47, "network e;" should be -- network; --.

Signed and Sealed this
Tenth Day of June, 2025

Coke Morgan Stewart
*Acting Director of the United States Patent and Trademark Office*